United States Patent Office

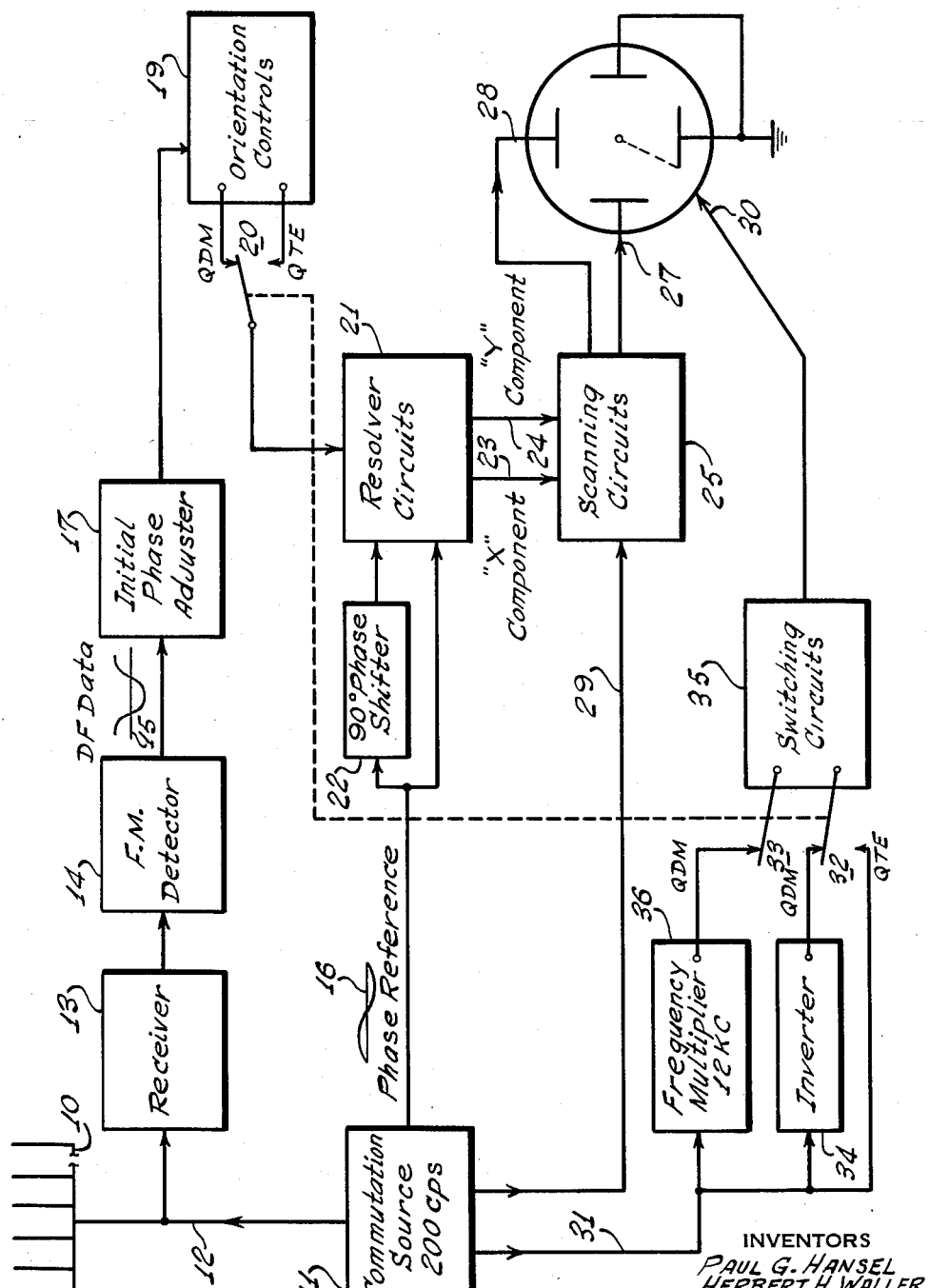

3,050,727
Patented Aug. 21, 1962

3,050,727
REVERSE BEARING INDICATOR
Paul G. Hansel, Greenvale, and Herbert H. Waller, Hicksville, N.Y., assignors to Servo Corporation of America, Hicksville, N.Y., a corporation of New York
Filed Oct. 26, 1960, Ser. No. 65,147
5 Claims. (Cl. 343—113)

This invention relates to bearing indicating arrangements, and, more specifically, to an error-proof reverse bearing indicator for use in a direction finding system.

International practice defines a "true" bearing known by the abbreviation QTE as one that is measured as the angular deviation from true north to a line joining an object and a direction finding station, whereas, a magnetic bearing is defined as being measured with respect to magnetic north from the object to the direction finding station. "True" bearing information is employed in plotting bearings on a map, or for triangulating the bearings from several remote stations. The reciprocal of the magnetic bearing, known by the abbreviation QDM, on the other hand, is, in effect, the heading of the object "homing" on the direction finding station.

Direction finding systems are conventionally utilized to ascertain data relative to the bearing of the direction finder with respect to a remote transmitting station; from this data the bearing may be indicated on a suitable display unit. A switch is provided to select either the direct or reciprocal "homing" bearing for display, and the bearing data is oriented with respect to a reference position. In such systems, a single orientation control is provided and the bearing is referenced to either true north or magnetic north. Since it is seldom that a true north orientation of a "homing" bearing is utilized, an arrangement, having a single orientation control, is inherently disadvantageous.

Moreover, in utilizing conventional indicating arrangements in the direction finding system, operators have occasionally become confused, and made the mistake of giving a direct bearing when actually a reciprocal or "homing" bearing was desired. The effect of this, when an aircraft was involved, was to direct the aircraft away from home instead of toward it, resulting in many tragedies. Attempts at avoiding this confusion by employing different colored lights which are synchronized with the selector switch have not been uniformly successful, since confusion by busy operators continues to take place.

Accordingly, it is an object of the invention to provide an indicating arrangement for use with a direction finding system which clearly and unmistakably indicates the selected bearing without any confusion.

It is another object of the invention to provide an indicating arrangement having independent selection and control means for true north and magnetic north bearing readings for use in a direction finding system.

In accordance with an aspect of the invention, there is provided an indicator for use in a direction finding system which is capable of independently and visually displaying two directional indications, each in distinctive form, on a display scope.

Bearing information is received by the direction finding system, which is selectively oriented with respect to true north or magnetic north, and resolved into orthogonal deflection voltage components. The voltage components are applied to the deflection circuits of the display scope to produce a diametral strobe line indicative of the bearing of the system with respect to the selected true north or magnetic north orientation. First blanking means are provided for blanking a radial portion of the diametral strobe line, and second blanking means are provided for blanking regular portions of the remaining radial portion of one of the selected orientations. In this manner, a radial line true north bearing, or an interrupted radial line reciprocal magnetic north bearing is produced on the display scope dependent on the selected orientation of the bearing information.

The above mentioned and other features and objects of this invention and the manner of attaining them will become more apparent and the invention itself will be best understood by reference to the following description of an embodiment of the invention taken in conjunction with the accompanying drawing, wherein a direction finding system and display indicating scope are shown, along with the circuitry for applying the detected bearing data to the scope.

The direction finding system utilized in ascertaining the bearing data for the arrangement of the invention is a conventional quasi-Doppler system which, as shown in the drawing, comprises a circular array of fixed antenna elements 10, electronically commutated at a specific frequency, for example, 200 cycles per second (c.p.s.), by switching signals obtained from a commutation source 11 and delivered to the array over a multiwire cable 12. The antenna elements of the array 10 receive radio frequency signals from a remote source (not shown), and deliver them to a receiver 13 and, thereafter, to a frequency modulation detector 14. The output of the detector 14 is a direction finder data signal 15 which has a frequency equal to the commutation frequency of the array 10 and a phase that is indicative of the bearing.

An orientation phase shifter 17 is provided through which the direction finder data signal 15 is passed. The phase shifter 17 provides an initial orientation or calibration of the direction finder with respect to true north, magnetic north, or any other reference position.

The detected data signal 15 is applied to resolver circuits 21 for resolution into orthogonal deflection components indicative of the bearing with respect to a true north or magnetic north reference. The reference for the data signal may be established by utilizing individual orientation control circuits 19 to phase-shift the signal 15 in accordance with a true north (QTE) or reciprocal magnetic north (QDM) orientation. Normally, these controls have a range of approximately ±60°.

Selection of one of these controls for orientation of the signal 15 is obtained by providing a manually operable switch 20. As shown in the drawing, selection has been made for a QDM or magnetic north reference.

Resolution of the data signal 15 is made with a reference signal 16 derived from the commutation source 11. The reference signal 16 is applied directly to the resolver circuits 21 for one channel, and through a 90° phase shifter 22 for the second channel. The orthogonal components of the data signal 15 are produced as direct current signals at the resolver channel outputs 23 and 24, respectively. If these signals are applied directly to a display scope 26, the bearing data, for the selected orientation, appears on the scope as a spot, and, therefore, they are first applied to scanning circuits 25 for conversion to alternating current vertical and horizontal sweep signals. The sweep signals are applied to the display scope 26 at the horizontal and vertical deflection plates 27 and 28, respectively, and produce a diametral strobe line on the face of the scope. A second reference signal is coupled over the line 29 to synchronize the scanning circuits. The strobe line is oriented with respect to true north or magnetic north as determined by the selection made at the switch 20. In addition, it is, of course, ambiguous since it is diametral.

To avoid the ambiguity of this strobe presentation and more readily to distinguish the orientation reference conditions, blanking signals are applied at the control circuit 30 of the display scope 26 for blanking certain portions of the diametral strobe. For this purpose, a third reference signal is coupled over the line 31 from the commutation source 11 through switching circuits 35 to the display scope 26. Switches 32 and 33, which are connected in mechanical synchronism with the switch 20, are provided to couple the reference signals having the proper phase to the display scope. In the magnetic north orientation condition, as shown, the signal from commutation source 11, which may be a square-wave, is coupled to an inverter 34 and through the switch 32 to a switching circuit 35, for example, transistorized switches, to be applied at the control circuit 30 of the display scope 26. The applied signal has a frequency of 200 c.p.s., corresponding to the frequency of the bearing data. However, the phase of this signal is inverted 180°, so that a radial strobe line reciprocal of the magnetic bearing is presented on the face of the scope 26. If the switch 32 is connected in position for a true north (QTE) orientation, the 200 c.p.s. reference signal is coupled directly to the switching circuit 35 for application at the control circuit 30 of the scope 26 to provide a radial strobe line direct bearing indication.

The commutation source 11 also delivers the reference signal to a frequency multiplier 36, which multiplies the frequency level of the 200 c.p.s. signal to a higher level, for example, 12 kilocycles, so that when the switch 33 is connected in the magnetic north (QDM) orientation condition, a second blanking signal is applied at the control circuit 30 producing an interrupted radial strobe line rather than a continuous line. When a true north orientation condition is selected, this second blanking signal is not applied to the control circuit 30; the switch 33 being in an open condition.

As shown and described, therefore, the bearing of an object to a remote station may be indicated with respect to a true north reference or a magnetic north reference by selecting one position of the switch 20. The true north indication is presented on the display scope 26, as a radial line, whereas the magnetic north indication is presented as an interrupted radial line, that is the reciprocal of the bearing.

While the foregoing description sets forth the principles of the invention in connection with specific apparatus, it is to be understood that this description is made only by way of example and not as a limitation of the scope of the invention as set forth in the objects thereof and in the accompanying claims. For example, the blanking signals may be applied to the control circuit 30, so that the true north indication is an interrupted radial line and the magnetic north indication is a solid radial line.

What is claimed is:

1. An indicator for use in a direction finder capable of selectively and visually displaying either of two independent directional indications each in distinctive form, comprising means for receiving bearing information, first and second control means for orienting said bearing information with respect to true north and magnetic north respectively, switch means for selecting one of said control means, a display scope having deflection circuits, means coupled to the output of said switch means for resolving said information into orthogonal deflection voltage components, means for applying said voltage components to said deflection circuits for producing a diametral strobe indicative of the bearing of said direction finder with respect to the selected true north or magnetic north orientation, first means for blanking a radial portion of the diametral strobe, and second means for blanking regular portions of the remaining radial portion of one of said selected orientations, whereby a radial true north bearing or a radial reciprocal magnetic north bearing is produced in distinctive form on said scope dependent on the selected orientation of said bearing information.

2. The indicator of claim 1, wherein the first blanking means includes inverting means for obtaining the reciprocal of the magnetic north bearing when said bearing information is oriented with respect to magnetic north.

3. The indicator of claim 2, wherein said display scope has a control circuit; the means for receiving bearing information includes an array of antenna elements, and means for commutating each of said elements in succession at a predetermined frequency; said first means for blanking also including means for applying a reference signal having said frequency from the commutating means directly to said control circuit of said scope when said bearing information is oriented with respect to true north to obtain said radial line true north bearing, means for applying a reference signal having said frequency from the commutating means to the inverting means whereby an inverted reference signal is produced, and means for applying said inverted reference signal to said control circuit of said scope when said bearing information is oriented with respect to magnetic north to obtain said radial line reciprocal magnetic bearing.

4. The indicator of claim 3, wherein said second means for blanking includes a frequency multiplier coupled to said means for commutating for multiplying the predetermined frequency of said reference signal, and means for applying the frequency multiplied signal to said control circuit of said scope, when said bearing information is oriented with respect to magnetic north for regularly interrupting said radial line reciprocal magnetic bearing.

5. The indicator of claim 1, wherein the means for receiving bearing information includes an array of antenna elements, and means for commutating each of said elements in succession at a predetermined frequency, and the resolving means includes means for applying a reference signal directly to the resolving means from the commutating means, and means for applying a signal in phase quadrature to said reference signal from the commutating means to the resolving means for resolving said bearing information into said orthogonal deflection voltage components.

References Cited in the file of this patent

UNITED STATES PATENTS

| | | |
|---|---|---|
| 2,399,671 | Gage | May 7, 1946 |
| 2,483,644 | Kelsey et al. | Oct. 4, 1949 |